Sept. 23, 1969     C. V. DI CAMILLO     3,468,340
MECHANICAL-TO-FLUID INTERFACE
Filed June 13, 1966
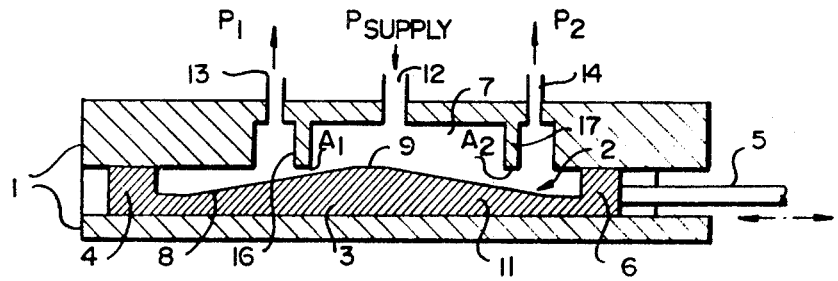
INVENTOR
CARMINE V. DiCAMILLO
BY *Hurvitz & Rose*
ATTORNEYS

United States Patent Office 3,468,340
Patented Sept. 23, 1969

3,468,340
MECHANICAL-TO-FLUID INTERFACE
Carmine V. Di Camillo, Silver Spring, Md., assignor to Bowles Engineering Corporation, Silver Spring, Md., a corporation of Maryland
Filed June 13, 1966, Ser. No. 557,146
Int. Cl. F15 1/10
U.S. Cl. 137—625.48                                5 Claims

ABSTRACT OF THE DISCLOSURE

A mechanical-to-fluid interface for converting linear motion to a pair of differentially varying fluid pressure signals is achieved by differentially varying the areas of two fluid passages in response to the linear motion. One side of each passage is defined by the sloping surface of a respective one of a pair of back-to-back wedges, the wedges being jointly slidable perpendicular to the planes of the variable areas in response to the linear motion. Pressurized fluid flow divides between the passages in proprtion to the passage areas to provide the differentially variable pressure signals.

---

The present invention relates to mechanical-to-fluid interfaces and, more particularly, to a mechanical-to-fluid interface for converting linear motion into differentially varying fluid pressures.

The mechanical-to-fluid interface is a very important device in control systems since it is required to generate both the command input and feedback signals in all physical positioning systems. One desired feature of such a device is good linearity. Another desirable feature is for the device to have a rather large range of operation, especially the feedback interface devices where it is convenient to have the stroke of the feedback follower equal to the actuator stroke so as to permit the feedback follower to be mounted directly on the actuator.

A conventional type of mechanical-to-fluid interface provided by the prior art is one in which the mechanical device operates as a flapper valve. A flapper valve as used herein relates to a device having a nozzle for issuing fluid and a mechanical element movable toward and away from the nozzle so as to vary the impedance to flow through the nozzle and thus produce variations in the pressure upstream of the nozzle. A twin nozzle and flapper arrangement may be employed to provide a differentially varying signal as between two passages of the system upstream of the two nozzles. In such a system, the mechanical element moves toward one nozzle at the same rate that it moves away from the other.

It can be shown that the flapper-type arrangement described above is unacceptable in many fluid systems due to the non-linearity of the device. Specifically, it can be shown that a variation of pressure with position of the nozzle which deviates one-half percent from linearity can be maintained only if the total deviation of the flapper relative to the nozzles is the order of 0.01 inch. Even under such severe restraints, a pressure variation of only ±10 percent of supply pressure can be obtained and the required flow is twice the signal flow. Thus, severe limitations on the travel and performance of such devices for linear performance is sufficiently great as to render the devices impractical in use where linearity is a requirement.

In accordance with the present invention, there is provided a mechanical-to-fluid interface that is substantially linear over a wide range of operation and which is quite simple in design. More particularly, the device comprises a triangular device, i.e. a device having the configuration of back-to-back wedges, with each sloping surface forming one surface of an area which is varied as the slide is moved along a plane perpendicular to the plane of the areas. As the slide is moved, the areas vary linearly and differentially with movement of the slide. Fluid under pressure is introduced into the region between the two variable areas. The flow divides and each branch of the flow is applied to a different control mechanism or the opposed nozzles of a pure fluid amplifier.

Under the circumstances set forth above, the apparatus is quite linear and, for instance, variations of ±37½ percent of the supply pressure may be effected with only a half of one percent non-linearity introduced into the pressure versus displacement function. Further the distance of travel of the device may be selected from a wide range of available travel distances by appropriate choice of the slope of the surfaces.

It is therefore an object of the present invention to provide an extremely simple and reliable mechanical-to-fluid interface having a relatively linear pressure versus displacement characteristic.

It is another object of the present invention to provide a mechanical-to-fluid interface in which a relatively high degree of linearity of pressure versus displacement may be maintained over a large range of pressure signals relative to the supply pressure.

The above and still further objects, features and advantages of the present invention will become apparent upon consideration of the following detailed description of one specific embodiment thereof, especially when taken in conjunction with the accompanying drawings, wherein:

FIGURE 1 is a cross-sectional view of the transducer of the present invention;

FIGURE 2 is a schematic circuit diagram of the transducer of the present invention connected in a fluidic system; and FIGURE 3 is a graph illustrating the theoretical linearities with displacement of the apparatus of the present invention and of a prior art device of similar construction.

Referring now specifically to FIGURE 1 of the accompanying drawings, there is illustrated a mechanical-to-fluid interface of the present invention. The interface includes a hollow body member 1 having a slide 2 positioned therein for horizontal translation as illustrated in FIGURE 1. The slide is connected to a translatable shaft 5 which may be connected to a mechanical device whose movement is to be monitored. The slide comprises an elongated body member 3 terminating in vertical end members 4 and 6 which cooperate with the body member 1 to provide a pressure-tight seal at the ends of a hollow chamber 7 formed in the device. The slide, inwardly of the members 4 and 6, comprises a gradually rising surface 8 terminating in an apex 9 and a gradually falling surface 11 terminating in the member 6, thereby forming, in effect, a pair of back-to-back wedge-shaped members. Normally, the members 8 and 9 have complementary slopes, i.e. are mirror images of one another about a vertical plane through the apex 9, so as to provide differential signals varying in a prescribed manner. It is to be understood that the slopes of the surfaces 8 and 11 may be different if other than a linear function is desired.

The upper member of the body 1 is provided in the center thereof above the apex 9 with a supply pressure inlet passage 12. Pressurized fluid is withdrawn from the apparatus through a first outlet passage 13 and a second outlet passage 14. The outlet passage 13 is adjacent the surface 8 and the outlet passage 14 is adjacent the surface 11. Positioned between the passages 12 and 13 is a downwardly depending shoulder 16 which extends between sidewalls of member 1. The shoulder 16 defines an upper surface of an area $A_1$ which may be varied by movement of the slide 3. A downwardly extending shoulder 17 is positioned between the passages 12 and 14 to define the upper surface of a second variable area $A_2$, also variable in accordance with movement of the slide 3.

It is apparent from the drawing that, as the slide 3 is moved, for instance to the left, the area provided under the shoulder 16 decreases as the area under the shoulder 17 increases. If the slopes 8 and 11 are complementary, the area under shoulder 16 decreases at exactly the same rate that the area under the shoulder 17 increases. The areas $A_1$ and $A_2$ are defined by the shoulders 16 and 17, respectively, the surfaces 8 and 11 and the two sides of the body 1 parallel to the plane of the page and therefore not visible.

Referring now specifically to FIGURE 2, there is illustrated schematically a circuit employing the apparatus of FIGURE 1. The circuit includes a source of fluid under pressure 18 for supplying the pipe 12 of the mechanism of FIGURE 1. Reference numeral 19 designates the area $A_1$ of FIGURE 1 and reference numeral 21 designates the variable area $A_2$ of FIGURE 1. Fluid under pressure transmitted through the areas $A_1$ and $A_2$ appears, as in FIGURE 1, in output passages 13 and 14 connected, respectively, to control nozzles 22 and 23 of a pure fluid amplifier generally designated by the reference numeral 24. The amplifier is provided with a power nozzle 26 and output channels 27 and 28.

It is apparent from the illustration of FIGURE 2 that, as the slide 3 of FIGURE 1 is translated, the areas $A_1$ and $A_2$ vary differentially so that the pressure appearing at the control nozzles 22 and 23 of the amplifier 24 vary differentially as a function of translation of the slide. The differential in pressure appearing in the passages 13 and 14 is also a function of the supply pressure 18 as well as a function of the position of the slide 3.

It can be shown that, in a device of the type illustrated in FIGURE 1, a high degree of linearity of differential in pressure is achieved with displacement of the slide 3. It can be shown that the relationship of equation 1 below specifies the operating condition of the device.

$$\frac{\Delta P}{P} = \frac{4\beta \frac{a}{A_o}}{\left[\left(1+\beta\left[1+\left(\frac{a}{A_o}\right)^2\right]\right)^2 - \left(\frac{2\beta a}{A_o}\right)^2\right]} \quad (1)$$

In this equation, the factor $\Delta P$ is the differential in pressure as between the passages 13 and 14, and $P$ is the supply pressure. Thus, the equation relates the differential in pressure, $\Delta P$, to supply pressure, $P$, in order to eliminate the effects of supply pressure on the equation. The term $\beta$ is defined by Equation 2 below:

$$\beta = \left(\frac{C_{do} A_o}{C_{dc} A_c}\right)^2 \quad (2)$$

where $C_{do}$ is the coefficient of the orifice forming the area $A_1$ or $A_2$. $C_{dc}$ is the coefficient of the control orifice of the control nozzle 22 or 23. $A_o$ is the area of the areas $A_1$ and $A_2$ when equal and $A_c$ is the area of the control nozzles of the amplifier 24. The factor $a$ is the change in area of $A_1$ and $A_2$ due to movement of the slide from its original position where both $A_1$ and $A_2$ are equal.

It will be noted that, in this equation, the numerator is linear, and thus, only the effects of the exponents of the denominator can affect the linearity of the apparatus. If the numerator and denominator of Equation 2 are made equal, i.e. the areas and coefficients of the orifices are designed to be equal under balanced conditions $A_1 = A_2$ the equation for the denominator becomes $$d = 4 + \left(\frac{a}{A_o}\right)^4 \quad (3)$$

When areas $A_1$ and $A_2$ are equal; that is, at mid-stroke, $a$ is equal to 0 and, hence, the denominator is equal to 4. In order to provide a specific example indicative of linearity, it is assumed that a one-half percent maximum deviation from linearity can be permitted. Under these circumstances, the denominator, when maximum deviation from linearity has been achieved, becomes equal to 4.02 and the ratio $\Delta P/P$ is equal to $\pm .374$ or 37.4 percent. Thus, a differential pressure equal to $\pm 37.4$ percent of the supply pressure may be obtained with only a half percent deviation from linearity.

The linearity of the apparatus of the present invention becomes apparent from the graph illustrated in FIGURE 3. Curve A of FIGURE 3 is a plot of the percent deviation from linearity of the differential pressure produced by the device of FIGURE 1 as a function of $a/A_o$; that is, the change in area of the slide relative to the midpoint area. It will be noted that the curve A is a relatively flat-topped curve thus permitting relatively large changes in area while maintaining small changes in deviations from linearity. The curve B of FIGURE 3 is a curve of a flapper type device in which the variable area of the flapper valve orifice is equal to the load orifice area (orifice of the control nozzles of the fluid amplifier) as in the device of FIGURE 1. The device from which the curve B is plotted uses essentially the same slide as the device of FIGURE 1 but pressurized fluid is supplied through the channels 13 and 14 to nozzles corresponding in position to the channels 13 and 14 of FIGURE 1. The device is otherwise open to the atmosphere. Thus, the slide mechanism is the same but is employed as a flapper rather than a movable wall of a variable area device.

It is clearly demonstrated by the graphs of FIGURE 3 that the variable area type of arrangement is quite superior to the flapper arrangement illustrated in the Graph B.

The length of the stroke which can be accommodated by the slide 3 is basically a function of the slope of the surfaces 8 and 11. There is a practical limit on how shallow these slopes may be. They should not be so shallow that surface irregularities can produce detectable variations in area as the slide is moved. Other than this, the only practical limitations on the device are the space available for the apparatus.

The apparatus has been described as a device for converting linear movement to differential pressure changes. It is apparent, and reference is again made to FIGURE 1, that if shaft 18 is a screw journaled in the end member 6 and screw threads are provided in an end wall of member 1, the device translates rotary motion into differential pressure. Since, in such a device, linear advance of the shaft 18 with rotation is inherent, no theoretical loss of linearity is encountered.

What I claim is:

1. A mechanical-to-fluid interface comprising a first fluid flow path, a second fluid flow path, at least two variable area passage means each included in a different one of said paths, each of said variable area passage means including movable means for varying the area of said passage means as a linear function of movement of said movable means, means for concurrently moving said movable means to vary differentially said areas, means connecting one end of each of said paths to a source of fluid under pressure, and a first and a second fixed area orifice each terminating, respectively, another end of said first and said second fluid flow paths, the product of the orifice coefficient of said variable area passage means and the area thereof, when the areas of both said variable area passage means are equal, being equal to the product of the orifice coefficient of each said orifice and its area.

2. A mechanical-to-fluid interface comprising a first fluid flow path, a second fluid flow path, at least two variable area passage means each included in a different one of said paths, each of said variable area passage means including movable means for varying the area of said passage means as a linear function of movement of said movable means, means for concurrently moving said movable means to vary differentially said areas, and means connecting one end of each of said paths to a source of fluid under pressure, wherein each said variable area passage means comprises a variable orifice having three fixed walls and wherein each said movable means comprises a wedge-shaped member having a sloping surface, said wedge-shaped member being translatable in a plane perpendicular to the plane of said variable orifice, said sloping surface providing a fourth wall of said variable orifice.

3. The combination according to claim 2 wherein said wedge-shaped members are secured to one another such that said sloping surfaces converge at an apex proximate the location at which said members are secured.

4. A mechanical-to-fluid interface comprising a first fluid flow path, a second fluid flow path, at least two variable area passage means each included in a different one of said paths, each of said variable area passage mens including movable means for varying the area of said passage means as a linear function of movement of said movable means, means for concurrently moving said movable means to vary differentially said areas, and means connecting one end of each of said paths to a source of fluid under pressure, wherein both said movable means together comprise a generally triangular-shaped slide having adjacent sloping surfaces, a first wall and a second wall spaced apart along the direction of movement of said slide, said walls being directed toward and spaced from different ones of said sloping surfaces, said means connecting an end of each of said paths to a source of fluid under pressure comprising means for supplying fluid to a region between said walls.

5. A mechanical-to-fluid translucer comprising an outer hollow chamber, a translatable slide in said chamber, said slide having a generally triangular shape providing adjacent sloping surfaces of complementary slope, a hollow region adjacent said surfaces, a pair of walls extending into said hollow region toward said slide, said walls being spaced along the direction of movement of said slide each adjacent a different one of said sloping surfaces, first means for providing fluid under pressure between said walls, and means providing fluid flow communication with regions on each side of said walls remote from said first means.

References Cited
UNITED STATES PATENTS

| | | | |
|---|---|---|---|
| 389,589 | 9/1888 | Metcalf | 137—609 X |
| 538,542 | 4/1895 | Shortt | 137—609 X |
| 606,119 | 6/1898 | Campbell | 137—625.25 |
| 2,974,643 | 3/1961 | Gillham et al. | 137—625.48 |
| 3,282,279 | 11/1966 | Manion | 137—81.5 |
| 3,289,687 | 12/1966 | Dunaway | 137—81.5 |

FOREIGN PATENTS 143,725  4/1961  U.S.S.R.

M. CARY NELSON, Primary Examiner

W. R. CLINE, Assistant Examiner

U.S. Cl. X.R.

137—81.5